US009967286B2

(12) United States Patent
Park

(10) Patent No.: US 9,967,286 B2
(45) Date of Patent: May 8, 2018

(54) APPARATUS AND METHOD FOR CONTROLLING ACCESS TO SECURITY CONTENT USING NEAR FIELD NETWORK COMMUNICATION OF MOBILE DEVICES

(71) Applicant: Fasoo.com Co., Ltd., Seoul (KR)

(72) Inventor: Jin-Sang Park, Seoul (KR)

(73) Assignee: Fasoo.com Co., Ltd. (KR)

( * ) Notice: Subject to any disclaimer, the term of this patent is extended or adjusted under 35 U.S.C. 154(b) by 21 days.

(21) Appl. No.: 14/895,493

(22) PCT Filed: Nov. 15, 2013

(86) PCT No.: PCT/KR2013/010374
§ 371 (c)(1),
(2) Date: Dec. 3, 2015

(87) PCT Pub. No.: WO2014/196700
PCT Pub. Date: Dec. 11, 2014

(65) Prior Publication Data
US 2016/0127416 A1     May 5, 2016

(30) Foreign Application Priority Data

Jun. 5, 2013   (KR) ........................ 10-2013-0064861

(51) Int. Cl.
*G06F 21/10* (2013.01)
*H04L 29/06* (2006.01)
(Continued)

(52) U.S. Cl.
CPC .............. *H04L 63/20* (2013.01); *G06F 21/10* (2013.01); *H04L 63/08* (2013.01); *H04L 63/10* (2013.01);
(Continued)

(58) Field of Classification Search
CPC ......... H04L 63/20; H04L 63/08; H04L 63/10; H04L 63/107; H04L 2463/101;
(Continued)

(56) References Cited

U.S. PATENT DOCUMENTS 9,100,064 B2 *  8/2015 Griffin ..................... H04B 5/02
2005/0108369 A1 *  5/2005 Sather .................. G06F 9/4411
709/220
(Continued)

FOREIGN PATENT DOCUMENTS

KR    10-2012-0005411    1/2012
KR    10-2012-0117910    10/2012
(Continued)

OTHER PUBLICATIONS

International Search Report for PCT/KR2013/010374 dated Mar. 27, 2014 from the Korean Intellectual Property Office.

*Primary Examiner* — Jahangir Kabir
(74) *Attorney, Agent, or Firm* — Schmeiser, Olsen & Watts LLP

(57) ABSTRACT

Disclosed is an apparatus for controlling access to a security content using near field network communication of mobile devices. A policy issuance provider registration unit requests a content security policy for a first content, a security content, to a service server, receives the content security policy for the first content, requests to the service server for a first mobile device to be registered as a content security policy issuance provider, and receives a result of registration and a provider policy from the service server. A policy issuance provider converting unit converts the first mobile device to the content security policy issuance provider when receiving a request for access for browsing the first content through near-field network communication from another mobile device in which a DRM client application is being executed. A temporary content security policy issuance unit (Continued)

issues a temporary content security policy for the first content through near-field network communication to the second mobile device so that the second mobile device can browse the first content.

13 Claims, 3 Drawing Sheets

(51) Int. Cl.
  *H04W 4/00* (2009.01)
  *H04W 48/16* (2009.01)
  *H04W 60/00* (2009.01)
  *H04W 12/08* (2009.01)

(52) U.S. Cl.
  CPC ............ *H04L 63/107* (2013.01); *H04L 67/42* (2013.01); *H04W 4/008* (2013.01); *H04W 12/08* (2013.01); *H04W 48/16* (2013.01); *H04W 60/00* (2013.01); *H04L 2463/101* (2013.01)

(58) Field of Classification Search
  CPC ..... H04W 4/008; H04W 12/08; H04W 48/16; H04W 60/00; G06F 21/10
  USPC ............................................................. 726/1
  See application file for complete search history.

(56) References Cited

U.S. PATENT DOCUMENTS

| | | | |
|---|---|---|---|
| 2013/0268582 A1* | 10/2013 | Sitati ..................... H04L 67/42 709/203 |
| 2014/0004793 A1* | 1/2014 | Bandyopadhyay ... H04W 4/008 455/41.1 |
| 2015/0121541 A1* | 4/2015 | Fay ........................ G06F 21/10 726/27 |
| 2016/0283699 A1* | 9/2016 | Levin ..................... G06F 21/10 |

FOREIGN PATENT DOCUMENTS

| KR | 10-2013-0011882 | 1/2013 |
| KR | 10-2013-0022846 | 3/2013 |
| KR | 10-2013-0030474 | 3/2013 |

* cited by examiner

APPARATUS AND METHOD FOR CONTROLLING ACCESS TO SECURITY CONTENT USING NEAR FIELD NETWORK COMMUNICATION OF MOBILE DEVICES

BACKGROUND

1. Field

The present disclosure relates to apparatuses and methods for controlling security content access rights by using near-field network communications of mobile devices, more particularly to apparatuses and methods for controlling access rights for security content by using near-field network communications of mobile devices, which can safely issue a security content access right in a closed network environment or an off-line environment.

2. Description of Related Art

The user who does not have a management right or an access right for security content cannot access the security content. Also, in cases of a closed network environment or an off-line environment where users cannot access a service server, access rights on the security content cannot be requested to the service server.

Also, a near-field communication (NFC) is one of radio frequency identification (RFID) technologies. It is a contactless near distance wireless communication technology which uses a 13.56 Mhz frequency band and is capable of transmitting data within a distance less than 10 centimeters with a low power. Usually, it is used by mobile communication terminals, personal computers, etc. The mobile communication terminals having NFC functionality may support a peer-to-peer communication, a RFID reading function, a card emulation function, etc. Among these, the peer-to-peer communication or the RFID function is an essential function which should be implemented in a NFC device.

SUMMARY

An aspect of exemplary embodiments is to provide apparatuses and methods for controlling access rights on a security content by using a near-field communication of a mobile device, which can safely receive issuance of an access right on a security content without reference to a connection status to a service server.

Another aspect of exemplary embodiments is to provide a computer-readable recording medium storing a program for executing methods for controlling access rights on a security content by using a near-field communication of a mobile device, which can safely receive issuance of an access right on a security content without reference to a connection status to a service server.

According to an aspect of exemplary embodiments of the present disclosure, an apparatus for controlling access rights for security content may be provided. The apparatus may comprise a policy issuance provider registration unit requesting a content security policy for a first content which is a security content to a service server, receiving the content security policy for the first content, requesting the service server to register a first mobile device as a content security policy issuance provider, and receiving a provider policy and a result of the registration from the service server, a policy issuance provider converting unit receiving an access right request for accessing the first content through near-field network communication from a second mobile device in which a digital rights management (DRM) client application is being executed, and converting the first mobile device to the content security policy issuance provider; and a temporary content security policy issuance unit issuing a temporary content security policy for the first content through the near-field network communications to the second mobile device so that the second mobile device can access the first content.

According to another aspect of exemplary embodiments of the present disclosure, a method for controlling access rights for security content, performed in an apparatus for controlling access rights on security content by using near-field network communications of a mobile device may be provided. The method may comprise (a) authenticating a user of a first mobile device by executing a downloadable DRM client application in the first mobile device; (b) requesting a content security policy for a first content which is a security content to a service server, receiving the content security policy for the first content, requesting the service server to register the first mobile device as a content security policy issuance provider, and receiving a provider policy and a result of the registration from the service server; (c) receiving an access right request for accessing the first content through near-field network communication from a second mobile device in which a DRM client application is being executed; (d) converting the first mobile device to the content security policy issuance provider; and (e) issuing a temporary content security policy for the first content through the near-field network communications to the second mobile device so that the second mobile device can access the first content.

According to yet another aspect of exemplary embodiments of the present disclosure, a computer-readable recording medium, on which a program code for the method for controlling access rights for security content by using near-field network communications of a mobile device according to one of the above-described methods is recorded, may be provided.

According to apparatuses and methods for controlling access rights for security content, access rights for security content can be safely issued through a near-field communication between mobile devices without reference to a connection status to a service server.

DETAILED DESCRIPTION OF EXEMPLARY EMBODIMENTS

Hereinafter, preferred exemplary embodiments of apparatuses and methods for controlling access rights for security content by using a near-field network communication of a mobile device (hereinafter, also referred to as 'security content access right control apparatus or method), according to the present disclosure, will be described by referring accompanying figures. Here, near-field communication (NFC) can be used as the near-field network communication. However, various exemplary embodiments are not restricted thereto.

Figure 1:
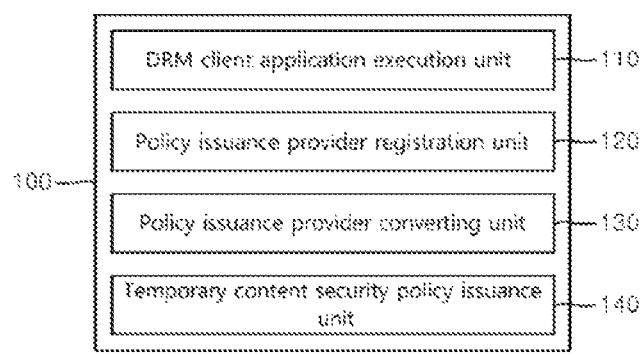
FIG. 1 is a block diagram illustrating a configuration of a security content access right control apparatus 100 according to the present disclosure.

FIG. 1 is a block diagram illustrating a configuration of a security content access right control apparatus 100 according to the present disclosure. Referring to FIG. 1, the security content access right control apparatus 100 according to an exemplary embodiment of the present disclosure may comprise a digital rights management (DRM) client application execution unit 110, a policy issuance provider registration unit 120, a policy issuance provider converting unit 130, and a temporary content security policy issuance unit 140.

Figure 2:
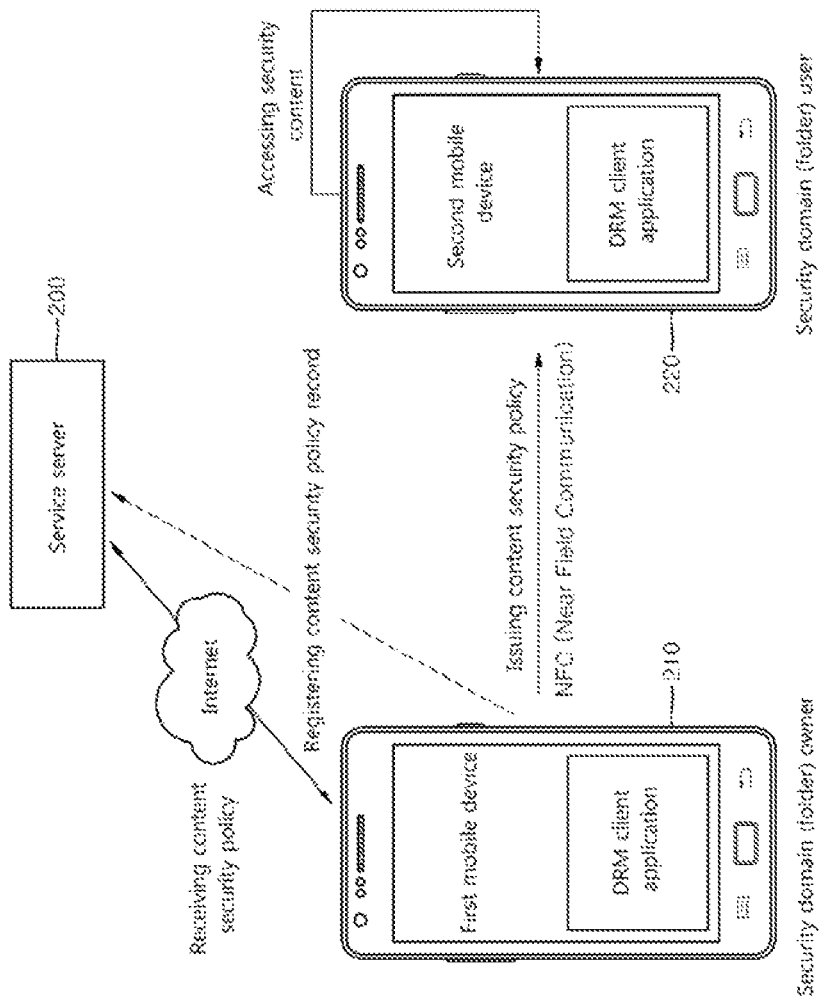
FIG. 2 is a view illustrating a system in which an apparatus for controlling access rights on security content by using near-field network communications of a mobile device according to the present disclosure.

The DRM client application execution unit 110 may execute a DRM client application which is downloaded in a mobile device. Referring to FIG. 2, a first mobile device 210 and a second mobile device 220 may execute respective DRM client applications. That is, the security content access right control apparatus 100 according to the present disclosure may basically be executed on a mobile device having a DRM client. Also, the execution of the DRM client application may mean that authentication of a user has been already completed.

Since the mobile device is a terminal whose user authentication from a service server 200 has already completed, it is not necessary to perform an additional user authentication when the mobile device is disconnected from the network.

In the first mobile device 210 executing the DRM client application, the policy issuance provider registration unit 120 may request a content security policy for security content to the service server 200, and receive the content security policy for the security content from the service server 200. Then, the policy issuance provider registration unit 120 may request the service server 200 to register the first mobile device 210 as a content security policy issuance provider, and receive a result of the registration. Also, it may receive a provider (issuance) policy together with the result of the registration.

The provider (issuance) policy may include at least one of time information, network information, policy issuance information, and right information. For example, the time information may be information on a time period for which the first mobile device 210 can operate as a provider (e.g., PM 12:30 May 8, 2013 to PM 16:00 May 8, 2013), and the network information may be information specifying a near-field communication protocol used for issuing a temporary content security policy which will be explained later. The policy issuance information may include information on the total number of issuances of the temporary content security policies which the first mobile device 210 can perform (e.g., 100 times), or information on an expiration time of the temporary content security policy which the mobile device 210 issues (e.g., 1 hour). The right information may be information on at least one content security classes of the temporary content security policy which can be issued by the first mobile device 210 as a provider (e.g., 'read-only' access right). However, various exemplary embodiments are not restricted thereto.

The policy issuance provider converting unit 130 may convert the first mobile device 210 to a content security policy issuance provider when receiving the access right request for accessing the security content from the second mobile device 220. However, the time when the first mobile device 210 is converted to the content security policy issuance provide may also be a time before the second mobile device 220 receives the access right request for accessing the security content from the second mobile device 220.

The temporary content security policy issuance unit 140 may issue the temporary content security policy for the security content to the second mobile device 220 through a near-field network communication, in order to make the second mobile device 220 be able to access the security content. That is, through this, the second mobile device 220 can temporarily obtain an access right for the security content from the first mobile device 210 without directly accessing the service server 200.

The temporary content security policy may include at least one of policy issuance information, content type information, user information, right information, and network information. For example, the policy issuance information may be information on an expiration time of the temporary content security policy which the mobile device 210 issues (e.g., 1 hour from the reception time of the temporary content security policy), and the content type information may include types of security content to which the temporary content security policy is applied (e.g., applied only to 'office' content). The user information may include information on user groups which can use the temporary content security policy (e.g., marketing business division), and the right information may be information on at least one content security classes of the temporary content security policy which can be issued by the first mobile device 210 as a provider (e.g., 'read', 'edit', 'print', 'decryption', and so on). Also, the network information may include a connection status maintaining option (e.g., whether the first mobile device 210 can access the security content or not even when the near-field network communication of the first mobile device 210 is disconnected). However, various exemplary embodiments are not restricted to.

Figure 3:
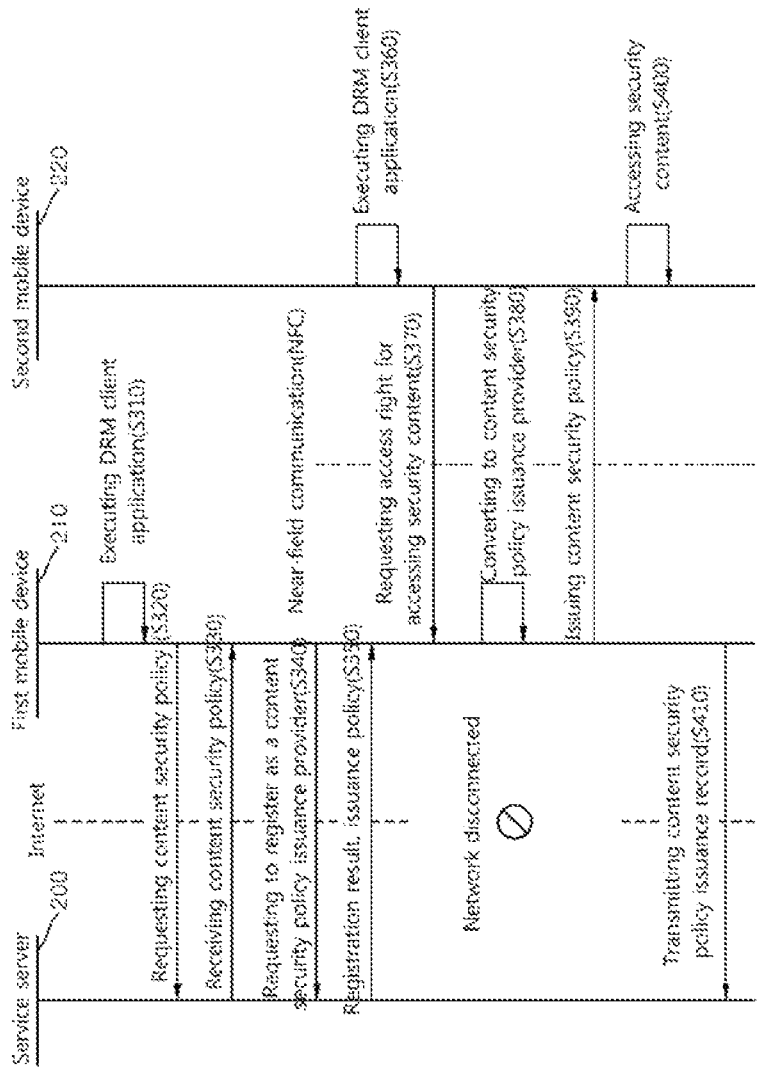
FIG. 3 is a sequence chart illustrating a method according to the present disclosure, for controlling access rights on security content by using a near-field network communication of a mobile device.

In order to specifically explain a method for controlling access rights for security content according to the present disclosure, FIG. 3 is provided. FIG. 3 is a sequence chart illustrating a method according to the present disclosure, for controlling access rights for security content by using a near-field network communication of a mobile device. As described above, each of the first mobile device 210 and the second mobile device 220 can execute each DRM client application (S310, S360).

Referring to FIG. 3, the first mobile device 210 in which a DRM client application is being executed (S310) may request a content security policy for a first content which is a security content to the service server 200 (S320). Then, the first mobile device 210 may receive the requested content security policy for the first content from the service server 200 (S300), and request the service server 200 to register the first mobile device 200 as a content security policy issuance provider (S340). Accordingly, the service server 200 may transmit a result of the registration and the provider (issuance) policy to the first mobile device 210. The first mobile device 200 should be connected to the service server 200 when the above-described steps S320 to S350 are performed.

Also, the first mobile device 210 registered as the content security policy issuance provider may receive an access right request for accessing the first content from the second mobile device 220 which is also executing a DRM client application (S360) through a near-field network communication (S370). Upon receiving the access right request, the first mobile device 210 may be converted to a content security policy issuance provider (S380), and issue a temporary content security policy in order to make the second mobile device 220 be able to access the first content which is the security content (S390). In this instance, the step S380 may also be performed before the step S370. However, the step S380 should be performed after the step S350.

Thus, the second mobile device 220 having received the temporary content security policy can access the first content (S400), and an access right class for the mobile device 220 may depend on the temporary content security policy for the first content. That is, the temporary content security policy may include information on an expiration time of the temporary content security policy which (e.g., 1 hour from the reception time of the temporary content security policy), information on types of security content to which the temporary content security policy is applied (e.g., applied only to 'office' content), information on user groups which can use the temporary content security policy (e.g., marketing business division), information on at least one content security classes which can be accessed under the temporary content security policy (e.g., 'read', 'edit', 'print', 'decryption', and so on), and a connection status maintaining option (e.g., whether the first mobile device 210 can access the security content or not even when the near-field network communication of the first mobile device 210 is disconnected).

The above-described steps S370 to S390 may be performed without reference to a connection status to the service server 200. That is, they can be performed only by near-filed network communications between the first mobile device 210 and the second mobile device 220.

That is, even in a closed network environment or an off-line environment where the service server 200 cannot be accessed, an access right on encrypted security content can be safely issued to the second mobile device 220 owned by a third person through near-field network communications with the first mobile device 210 owned by a user having accessing the security content.

The first mobile device may transmit a record (i.e., issuance history) of the temporary content security policy on the first content issued to the second mobile device 200 to the service server 200. At this time, the first mobile device 210 may be connected to the service server 200.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The apparatuses and methods according to the present disclosure may be implemented as a program code recorded in a computer-readable recording medium. The computer-readable recording medium may include all types of storage devices on which computer-readable data can be stored. For example, the computer-readable recording medium may be read-only memory (ROM), random access memory (RAM), compact disc ROM (CD-ROM), magnetic tape, a floppy disc, an optical data storage device, etc. Also, a carrier wave (i.e., transmission through internet) may be included as the computer-readable recording medium. Also, the computer-readable recording medium may be distributed over computer systems connected through wire or wireless communication networks, and the computer-readable program code can be stored and executed in the distributive manner.

While the example embodiments of the present invention and their advantages have been described in detail, it should be understood that various changes, substitutions and alterations may be made herein without departing from the scope of the invention.

The invention claimed is:

1. An apparatus for controlling access rights for security content, the apparatus comprising:
   a processor; and
   a memory storing instructions configured to instruct the processor to perform:
   (a) authenticating a user of a first mobile device by executing a downloadable digital rights management (DRM) client application in the first mobile device;
   (b) requesting a content security policy for a first content which is a security content to a service server, receiving the content security policy for the first content, requesting the service server to register the first mobile device as a content security policy issuance provider, and receiving a provider policy and a result of the registration from the service server;
   (c) receiving an access right request for accessing the first content through near-field network communication from a second mobile device in which the digital rights management (DRM) client application is being executed;
   (d) converting the first mobile device to the content security policy issuance provider;
   (e) issuing a temporary content security policy for the first content through the near-field network communications to the second mobile device so that the second mobile device can access the first content;
   (f) transmitting, to the service server, a record of temporary content security policies for the first content issued to the second mobile device, and
   wherein, once the user authentication is performed, no additional user authentication is requested when the network is disconnected; and
   (g) issuing, by the first mobile device, a temporary content security policy for the first content to the second mobile device in a closed network environment or an off-line environment in response to the determination that the service server cannot be accessed, and
   wherein the provider policy includes at least one of time information, network information, policy issuance information, and right information.

2. The apparatus according to claim 1, wherein step (d) is performed before step (c).

3. The apparatus according to claim 1, wherein the time information is information on an expiration time of a provider role of the first mobile device; the network information indicates a near-field network communication protocol used for issuing the temporary content security policy; the policy issuance information is information on a total number of the temporary content security policies which the first mobile devices can issue as the provider or an expiration time of the temporary content security policy issued by the first mobile device; and the right information is information on an access right class of a temporary content security policy which the first mobile device can issue as the provider.

4. The apparatus according to claim 1, wherein the temporary content security policy includes at least one of policy issuance information, content type information, user information, right information, and network information.

5. The apparatus according to claim 4, wherein the policy issuance information is information on an expiration time of the temporary content security policy; the content type information is information on types of security content to which the temporary content security policy is applied; the user information is information on user groups which can use the temporary content security policy, the right information is information on access right classes which can be used based on the temporary content security policy.

6. A method for controlling access rights for security content, performed in an apparatus for controlling access rights on security content by using near-field network communications of a mobile device, the method comprising:
(a) authenticating a user of a first mobile device by executing a downloadable digital rights management (DRM) client application in the first mobile device;
(b) requesting a content security policy for a first content which is a security content to a service server, receiving the content security policy for the first content, requesting the service server to register the first mobile device as a content security policy issuance provider, and receiving a provider policy and a result of the registration from the service server;
(c) receiving an access right request for accessing the first content through near-field network communication from a second mobile device in which a DRM client application is being executed;
(d) converting the first mobile device to the content security policy issuance provider;
(e) issuing a temporary content security policy for the first content through the near-field network communications to the second mobile device so that the second mobile device can access the first content;
(f) transmitting, to the service server, a record of temporary content security policies for the first content issued to the second mobile device, and
wherein once the user authentication is performed, no additional user authentication is requested when the network is disconnected; and
(g) issuing, by the first mobile device, a temporary content security policy for the first content to the second mobile device in a closed network environment or an off-line environment in response to the determination that the service server cannot be accessed, and
wherein the provider policy includes at least one of time information, network information, policy issuance information, and right information.

7. The method according to claim 6, wherein the step (d) is performed before the step (c).

8. The method according to claim 6, wherein the time information is information on an expiration time of a provider role of the first mobile device; the network information indicates a near-field network communication protocol used for issuing the temporary content security policy; the policy issuance information is information on a total number of the temporary content security policies which the first mobile devices can issue as the provider or an expiration time of the temporary content security policy issued by the first mobile device; and the right information is information on an access right class of a temporary content security policy which the first mobile device can issue as the provider.

9. The method according to claim 6, wherein the temporary content security policy includes at least one of policy issuance information, content type information, user information, right information, and network information.

10. The method according to claim 9, wherein the policy issuance information is information on an expiration time of the temporary content security policy; the content type information is information on types of security content to which the temporary content security policy is applied; the user information is information on user groups which can use the temporary content security policy, the right information is information on access right classes which can be used based on the temporary content security policy.

11. A non-transitory computer-readable recording medium having embodied thereon a program, which when executed by a computer causes the computer to execute a method comprising:
(a) authenticating a user of a first mobile device by executing a downloadable digital rights management (DRM) client application in the first mobile device;
(b) requesting a content security policy for a first content which is a security content to a service server, receiving the content security policy for the first content requesting the service server to register the first mobile device as a content security policy issuance provider, and receiving a provider policy and a result of the registration from the service server;
(c) receiving an access right request for accessing the first content through near-field network communication from a second mobile device in which a DRM client application is being executed;
(d) converting the first mobile device to the content security policy issuance provider;
(e) issuing a temporary content security policy for the first content through the near-field network communications to the second mobile device so that the second mobile device can access the first content;
(f) transmitting, to the service server, a record of temporary content security policies for the first content issued to the second mobile device, and
wherein once the user authentication is performed, no additional user authentication is requested when the network is disconnected; and
(g) issuing, by the first mobile device, issues a temporary content security policy for the first content to the second mobile device in a closed network environment or an off-line environment in response to the determination that the service server cannot be accessed, and
wherein the provider policy includes at least one of time information, network information, policy issuance information, and right information.

12. The non-transitory computer-readable recording medium according to claim 11, wherein the step (d) is performed before the step (c).

13. The non-transitory computer-readable recording medium according to claim 11, wherein the temporary content security policy includes at least one of policy issuance information, content type information, user information, right information, and network information.

* * * * *